(12) United States Patent
Kladias et al.

(10) Patent No.: US 10,377,655 B2
(45) Date of Patent: Aug. 13, 2019

(54) INDUCTION HEATING METHOD AND APPARATUS FOR SHAPING THIN GLASS (71) Applicant: CORNING INCORPORATED, Corning, NY (US)

(72) Inventors: Nikolaos Pantelis Kladias, Horseheads, NY (US); Anurag Jain, Painted Post, NY (US); John Christopher Thomas, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 84 days.

(21) Appl. No.: 15/521,795

(22) PCT Filed: Nov. 6, 2015

(86) PCT No.: PCT/US2015/059367
§ 371 (c)(1),
(2) Date: Apr. 25, 2017

(87) PCT Pub. No.: WO2016/073808
PCT Pub. Date: May 12, 2016

(65) Prior Publication Data
US 2017/0240453 A1 Aug. 24, 2017

Related U.S. Application Data

(60) Provisional application No. 62/076,821, filed on Nov. 7, 2014.

(51) Int. Cl.
*C03B 23/023* (2006.01)
*C03B 23/00* (2006.01)
(Continued)

(52) U.S. Cl.
CPC ...... *C03B 23/0086* (2013.01); *C03B 23/0235* (2013.01); *C03B 23/0258* (2013.01); *C03B 29/025* (2013.01); *C03B 29/08* (2013.01)

(58) Field of Classification Search
None
See application file for complete search history.

(56) References Cited

U.S. PATENT DOCUMENTS 4,061,451 A   12/1977  Bardet
4,471,488 A *  9/1984  Reboux ................... C03B 5/021
                                                 373/153
(Continued)

FOREIGN PATENT DOCUMENTS

CH         276084      6/1951
WO      2013055589     4/2013
(Continued)

OTHER PUBLICATIONS

Patent Cooperation Treaty International Notification of Transmittal of the International Search Report and The Written Opinion of the International Searching Authority. International application No. PCT/US2015/059367: dated Feb. 5, 2016, 14 pages.

*Primary Examiner* — Cynthia Szewczyk (57) ABSTRACT

Disclosed herein are systems for shaping glass structures, comprising a shaping mold; a magnetic field generator; and a susceptor plate positioned substantially between the shaping mold and the magnetic field generator. Also disclosed herein are systems for shaping a glass structures, comprising a magnetic field generator comprising at least one induction coil and a one power supply connected to the at least one induction coil; and a susceptor plate having a first surface proximate the at least one induction coil and an opposing second surface proximate the glass structure. Further disclosed herein are methods for heating glass structures, comprising positioning the glass structure on a shaping mold; introducing the shaping mold and glass structure into a furnace; and indirectly heating at least a portion of the glass structure using at least one induction heating source.

14 Claims, 6 Drawing Sheets

(51) Int. Cl.
  *C03B 23/025* (2006.01)
  *C03B 29/02* (2006.01)
  *C03B 29/08* (2006.01)

(56) References Cited

U.S. PATENT DOCUMENTS

| | | |
|---|---|---|
| 6,279,346 B1 | 8/2001 | Ribes et al. |
| 8,986,072 B2 | 3/2015 | Darcangelo et al. |
| 2002/0153838 A1* | 10/2002 | Johnston ............ C03B 23/043 313/570 |
| 2010/0129602 A1 | 5/2010 | Dejneka |
| 2010/0300152 A1* | 12/2010 | Dannoux ............ C03B 23/0305 65/66 |
| 2011/0277506 A1 | 11/2011 | Lewandowski et al. |
| 2012/0094084 A1 | 4/2012 | Fisher et al. |
| 2012/0297828 A1 | 11/2012 | Bailey et al. |
| 2012/0328843 A1 | 12/2012 | Cleary et al. |
| 2013/0086948 A1 | 4/2013 | Bisson et al. |
| 2013/0125589 A1 | 5/2013 | Dannoux et al. |
| 2013/0125592 A1 | 5/2013 | Bisson |
| 2013/0127202 A1 | 5/2013 | Hart |
| 2013/0295357 A1 | 11/2013 | Cleary et al. |
| 2013/0319046 A1 | 12/2013 | Cleary et al. |
| 2013/0323415 A1 | 12/2013 | Brackley et al. |
| 2013/0329346 A1 | 12/2013 | Dannoux et al. |
| 2014/0087159 A1 | 3/2014 | Cleary et al. |
| 2014/0087193 A1 | 3/2014 | Cites et al. |
| 2014/0141217 A1 | 5/2014 | Gulati et al. |
| 2014/0157828 A1 | 6/2014 | Dannoux et al. |
| 2014/0239034 A1 | 8/2014 | Cleary et al. |
| 2014/0356604 A1 | 12/2014 | Borrelli et al. |
| 2015/0064374 A1 | 3/2015 | Jain et al. |
| 2015/0111016 A1 | 4/2015 | Fisher et al. |
| 2015/0122406 A1 | 5/2015 | Fisher et al. |
| 2015/0132538 A1 | 5/2015 | Cleary et al. |
| 2015/0140301 A1 | 5/2015 | Fisher et al. |
| 2015/0158275 A1 | 6/2015 | D'Errico et al. |
| 2015/0158277 A1 | 6/2015 | Fisher et al. |
| 2015/0232366 A1 | 8/2015 | Fredholm et al. |
| 2015/0232367 A1 | 8/2015 | Joubaud et al. |
| 2015/0251377 A1 | 9/2015 | Cleary et al. |
| 2015/0274567 A1* | 10/2015 | Boughton ............ H05H 1/2406 65/135.6 |
| 2015/0274571 A1 | 10/2015 | Brennan et al. |
| 2015/0321490 A1 | 11/2015 | Verdugo et al. |
| 2015/0321940 A1 | 11/2015 | Dannoux et al. |
| 2016/0082705 A1 | 3/2016 | Fisher et al. |
| 2016/0145139 A1 | 5/2016 | Fredholm et al. |
| 2016/0207290 A1 | 7/2016 | Cleary et al. |
| 2016/0207819 A1 | 7/2016 | Cleary et al. |
| 2016/0207820 A1 | 7/2016 | Cleary et al. |
| 2016/0250825 A1 | 9/2016 | Cleary et al. |

FOREIGN PATENT DOCUMENTS

| | | |
|---|---|---|
| WO | 2014004085 | 1/2014 |
| WO | 2014099560 | 6/2014 |

\* cited by examiner

INDUCTION HEATING METHOD AND APPARATUS FOR SHAPING THIN GLASS

CROSS-REFERENCE TO RELATED APPLICATIONS

This application is a national stage entry of International Patent Application Ser. No. PCT/US15/59367 filed on Nov. 6, 2015, which claims the benefit of priority under 35 U.S.C. § 119 of U.S. Provisional Application Ser. No. 62/076821 filed on Nov. 7, 2014 the content of which is relied upon and incorporated herein by reference in its entirety.

FIELD OF THE DISCLOSURE

The disclosure relates generally to methods and systems for shaping glass structures, and more particularly to methods and systems for bending thin glass sheets using induction heating.

BACKGROUND

The ability to thermally shape and form thin glass sheets is increasingly relevant to various industries. By way of a non-limiting example, the production of glass panes for automobiles is a complex process, which is constantly changing due to increasingly stringent environmental and safety requirements. The demand for intricate glass shapes with high optical quality and low weight is growing as governmental regulations require increased fuel economy and reduced emissions. The ability to make automotive parts from thinner glasses may translate to lower vehicle weight, improved fuel economy, reduced emissions, and/or improved vehicle weight distribution (e.g., lower center of gravity).

Prior art methods for shaping glass include placing glass sheets on a shaping mold, conveying the glass through a furnace to uniformly heat and soften the sheets, and allowing the softened glass to sag under gravity to assume a desired shape. The shaping mold serves as a surface around which the glass sheet can be formed to the desired shape. Such conventional shaping systems may work well with traditional glasses, which are thicker, such as glasses having a thickness ranging from greater than about 3 mm to about 6 mm. Thicker glass sheets can generally undergo viscous deformation while avoiding what is known in the art as the "bathtub effect," where the edges of the glass show a steep falloff and the center is flat.

However, when thinner glasses (e.g., having thicknesses less than about 2-3 mm) are processed using these traditional methods, the glass tends to distort and stretch, which leads to excessive viscous thinning at the edges and the falling away of the bulk center of the glass under the gravitational load as well as undesirable wrinkling around the edges. Bending of large thin sheets of glass to form automobile parts such as roof panels, windshields, etc., may necessitate the establishment of a large temperature differential between the edges and the center of the glass.

Shaping of large thin sheets of glass may be performed in a lehr that is comprised of a number of furnaces arranged in series in which the temperature of the glass sheet is gradually raised to accomplish sagging under gravity. However, the temperature differential to achieve the desired shape for thin glasses cannot be accomplished with simple variable heating in the furnace due to radiation view factors from the hot and cold zones of the furnace walls to both the center and edges of the glass. Additional means are needed to block radiation, e.g., radiation from the hot furnace zone to the glass edges and from the cold furnace zone to the center of the glass. Heat shields and/or heat sinks can be used to block or absorb radiant heat along the glass edges. However, this solution may not be satisfactory for bending thin glass sheets for a variety of reasons, including undesired heat transfer across the glass sheet and a gradual loss of effectiveness of the heat shield as it heats up during the bending process. Moreover, heat shields can be bulky, cumbersome, and can add complexity and/or cost to the glass shaping operation.

Accordingly, it would be advantageous to provide methods and systems for shaping and tempering thinner glass sheets, more specifically a system that is able to establish a sufficient temperature differential between the edges and the center of a thin glass sheet. To reduce manufacturing costs and/or processing times, it may additionally be advantageous to provide a system that can function, at least in part, in conjunction with existing systems for bending and tempering traditional (e.g., thicker) glasses.

SUMMARY

In some embodiments, a system is provided with a temperature differential such that the edges of the glass have lower temperatures than the center of the glass. Other embodiments can provide methods and systems for establishing a temperature differential between different portions of a glass sheet without the use of heat shields, heat sinks, and/or variable furnace heating with complex control schemes.

The disclosure also relates, in various embodiments, to systems for shaping glass structures, the systems comprising a shaping mold, a magnetic field generator, and a susceptor plate positioned substantially between the magnetic field generator and the shaping mold. In certain embodiments, the magnetic field generator may comprise at least one induction coil and at least one power supply connected to the at least one induction coil. According to various embodiments, the susceptor plate can include a first surface proximate the at least one induction coil and an opposing second surface proximate the glass structure. The power supply may, in some embodiments, be a dielectric (RF) power supply producing an alternating current.

The disclosure further relates to methods for heating and/or shaping glass structures, the methods comprising positioning the glass structure(s) on a shaping mold, introducing the shaping mold and glass structure(s) into a furnace, and indirectly heating at least a portion of the glass structure(s) using at least one induction heating source. The methods disclosed herein can, for example, be used to establish a differential heating profile across the glass structure. In various embodiments, one or more portions of the glass structure can be heated to a temperature ranging from about 400° C. to about 1000° C. In additional embodiments, the furnace residence time can range from about 1 minute to about 60 minutes or more. According to certain non-limiting embodiments, the glass structure may have a thickness of about 3 mm or less, such as ranging from about 0.1 mm to about 3 mm, from about 0.3 to about 2.5 mm, from about 0.5 mm to about 2 mm, from about 0.7 mm to about 1.5 mm, or from about 1 mm to about 1.2 mm. The glass structure can be chosen from, e.g., a single sheet of glass, multiple sheets of glass in a single stack, a glass-glass laminate structure, and a glass-polymer laminate structure.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be best understood when read in conjunction with the following drawings, where like structures are indicated with like reference numerals and in which.

DETAILED DESCRIPTION

Systems

Disclosed herein are systems for shaping glass structures, the systems comprising a shaping mold, a magnetic field generator, and a susceptor plate positioned substantially between the magnetic field generator and the shaping mold. Also disclosed herein are systems for shaping glass structures, the systems comprising a magnetic field generator comprising at least one induction coil and at least one power supply connected to the at least one induction coil; and a susceptor plate having a first surface proximate the at least one induction coil and an opposing second surface proximate the glass structure. Exemplary glass structures include, but are not limited to, a single sheet of glass, multiple sheets of glass in a single stack, a glass-glass laminate structure, and a glass-polymer laminate structure, to name a few.

Figure 1:
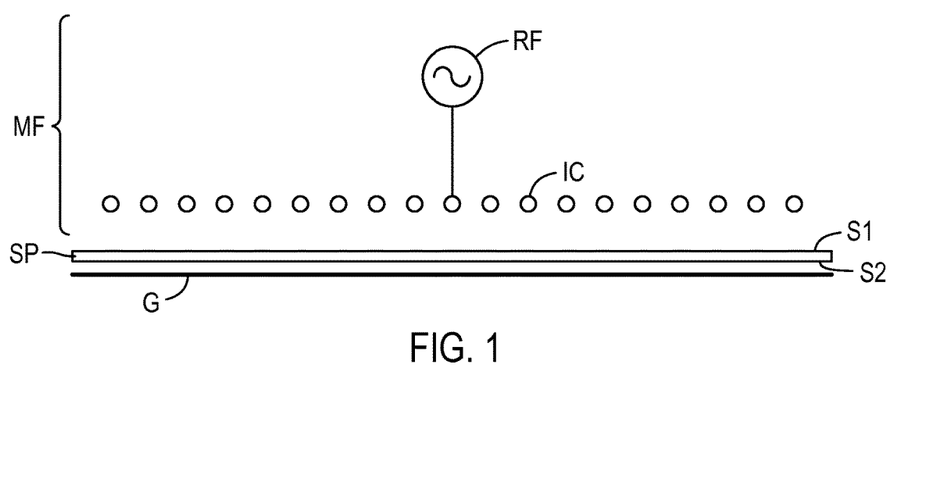
FIG. 1 illustrates a system for shaping glass structures according to one embodiment of the disclosure.

With reference to FIG. 1, one embodiment of an exemplary system for shaping glass structures according to the disclosure is illustrated, including a magnetic field generator MF, which can comprise at least one induction coil IC and at least one power source RF connected to the induction coil. A susceptor plate SP can be positioned proximate to the induction coil IC. A glass sheet G can be positioned in proximity to the susceptor plate SP, e.g., on a shaping mold (not shown).

The glass structure G may be conveyed or otherwise introduced into a furnace or any other heating means comprising an induction heating source. The induction heating source can induce localized heating in at least a portion of the susceptor plate, which can, in turn provide localized heat to at least a portion of the glass structure via radiant heat transfer. It is to be understood that while, in certain embodiments, induction and radiant heating may be the dominant heating modes for the susceptor plate and glass structure, respectively, other heat transfer modes can be present, including convection and conduction heating. For instance, in some embodiments, the glass structure can be heated predominantly by radiant heat from the susceptor plate, but other heat transfer modes, such as induction, convection, and conduction heating, can also contribute to the overall heating. According to various embodiments, radiant heating can make up greater than about 50% of the overall heating of the glass, such as greater than about 60%, greater than about 70%, greater than about 80%, or greater than about 90% of the total heating. Other combinations of heating modes are envisioned and are intended to fall within the scope of the application.

The induction heating source may comprise, in certain exemplary embodiments, a magnetic field generator MF. The magnetic field generator can comprise at least one induction coil IC and at least one power supply RF connected to the at least one induction coil. A controller (not shown) can be connected to the power supply in various embodiments. The magnetic field generator can produce a magnetic field effective to inductively heat the susceptor plate SP to a desired temperature. The susceptor plate, which can be positioned proximate the induction coil (first surface S1) and proximate the glass structure (second surface S2), can transfer heat from the coil to the glass structure by radiant heat transfer, thereby raising the temperature of at least a portion of the glass structure G.

The power supply RF can be chosen from any suitable power supply for induction heating, for example, a dielectric power supply. The power supply can produce, e.g., an alternating current. In some embodiments, the alternating current can have a frequency (f) ranging from about 1 kHz to about 400 kHz, such as from about 10 kHz to about 350 kHz, from about 30 kHz to about 300 kHz, from about 50 kHz to about 250 kHz, or from about 100 kHz to about 200 kHz, including all ranges and subranges therebetween. The current amplitude can range, in various embodiments, from about 100 A to about 2,000 A, such as from about 200 A to about 1,500 A, or from about 500 A to about 1000 A, including all ranges and subranges therebetween.

When the alternating current flows through the induction coil, the induction coil can generate a magnetic field. The magnetic field can then induce eddy currents in the susceptor plate, which can result in the inductive heating of the susceptor plate. In some non-limiting embodiments, the induction heating source, e.g., magnetic field generator, may induce heating in the susceptor plate to a temperature ranging from greater than about 600° C. to about 1000° C., such as from about 650° C. to about 900° C., or from about 700° C. to about 800° C.

According to various embodiments, the size and/or location of the heated area of the susceptor plate can be directly proportional to the size and/or location of the induction coil. Moreover, because the temperature of select portions of the glass structure proximate the susceptor plate can be locally raised by radiant heat transfer from the induction coil via the susceptor, the size and/or location of the heated area of the glass structure can also be directly proportional to the size and/or location of the induction coil. As such, the induction coil can, in certain embodiments, be configured to extend across, cover, or define a desired glass bending shape, e.g., to heat one or more portions of the glass structure. According to various embodiments, the induction coil can be configured to indirectly heat, via the susceptor plate, a central portion of the glass structure or the edges of the glass structure, or other regions of the glass structure, and so forth.

The induction coil can define a regular or irregular shape, as desired for any particular application. For example, the induction coil can be configured to create a generally square or round shape, or any other regular or irregular shape desired for bending a portion of the glass structure. According to various embodiments, the area defined by the at least one induction coil can range, for instance, from about 25 $cm^2$ to about 10,000 $cm^2$, such as from about 100 $cm^2$ to about 6,000 $cm^2$, or from about 500 $cm^2$ to about 2,500 $cm^2$, including all ranges and subranges therebetween. The induction heating coil can, in various embodiments, comprise an electrically conducting material, such as a metal or metal alloy, e.g., one or more copper wires. According to certain embodiments, the induction heating coil can be wound with litz wire, which can reduce skin effect losses at higher frequencies. The induction coil can, for example, be wound on a nonmagnetic material, such as plastics, ceramics, or the like. In other embodiments, e.g., for operation at lower frequencies, the induction coil can be wound on a magnetic core, for example, a core comprising a ferromagnetic material such as iron, which can increase inductance.

The susceptor plate can comprise any electrically resistive material suitable for induction heating by a generated magnetic field. Non-limiting examples of such materials include, for instance, carbon nanotubes, or metals and metal alloys, such as stainless steel, silver, copper, aluminum, tungsten, zinc, nickel, iron, platinum, nichrome, and the like. The resistivity of the susceptor plate can, in certain embodiments, range from about 1.6e-6 to about 1.1e-4 $\Omega \cdot cm$ at room temperature. The susceptor plate can have any shape and/or size suitable for a desired application including regular shapes, such as a circle, oval, square, rectangle, polygon, etc., and various irregular shapes.

According to certain embodiments, the susceptor plate can be a sheet, e.g., a metal or metal alloy sheet. The sheet can have at least one dimension, e.g., length, width, and/or diameter, ranging from about 0.1 m to about 2 m, such as from about 0.5 m to about 1.5 m, or from about 0.75 m to about 1 m, including all ranges and subranges therebetween. The thickness of the susceptor plate can range, for instance, from about 0.1 mm to about 20 mm, such as from about 0.2 mm to about 10 mm, or from about 0.5 mm to about 5 mm, including all ranges and subranges therebetween. Of course, these dimensions are exemplary only and may vary depending on process parameters, such as glass sheet dimensions, operating temperature, susceptor plate material, and/or induction heating unit operating frequency.

In various non-limiting embodiments, the susceptor plate can be positioned substantially between the magnetic field generator and the shaping mold (or glass structure). A first surface of the susceptor plate can be proximate the induction coil, for instance, a distance between the susceptor plate and the induction coil can range from about 1 mm to about 100 mm, such as from about 10 mm to about 75 mm, or from about 15 mm to about 50 mm, including all ranges and subranges therebetween. Similarly, a second surface of the susceptor plate can be proximate the glass structure, e.g., at a distance ranging from about 1 mm to about 50 mm, such as from about 5 mm to about 30 mm, or from about 10 mm to about 20 mm, including all ranges and subranges therebetween. Of course, these distances are exemplary only and may vary depending on process parameters such as glass thickness, operating temperature, susceptor plate material, desired glass temperature differential, and the like.

Although not illustrated in FIG. 1, the glass structure G may be placed on a shaping mold. The shaping mold may comprise any object that has a surface on or around which the glass can be shaped. The shaping mold may have any shape and size suitable for producing a shaped glass product for a particular application. For instance, the shaping mold may be designed so as to impart a desired curvature to a glass sheet, for example, in the case of windshields and rear or side windows for an automobile. Other shapes and configurations are envisioned and within the scope of the application. In some embodiments, the shaping mold may be a gravity bending ring mold, a fixed shape gravity ring, a multi-shape articulated gravity sag ring, a full surface mold optionally with vacuum assist. The above molds may be used, for example, with an optional pre-tensioning mechanism. Of course, the disclosure should not be limited to gravity bending methods as embodiments described herein may also be applicable to press assist bending methods.

Shaping systems disclosed herein can be used to bend glass structures to produce a variety of shapes, such as convex and concave shapes suitable for automotive applications, e.g., windshields, roof panels, side windows, and the like. The glass structures can be shaped, for example, by heating a central portion of the glass structure such that it sags under gravity, while maintaining a relatively cool temperature at the glass edges to prevent sagging, or vice versa. Of course, the claims appended herewith should not be limited solely to automotive applications as the subject matter is applicable to a wide variety of applications such as, but not limited to, architectural applications, other transportation applications, and the like.

Figure 2:
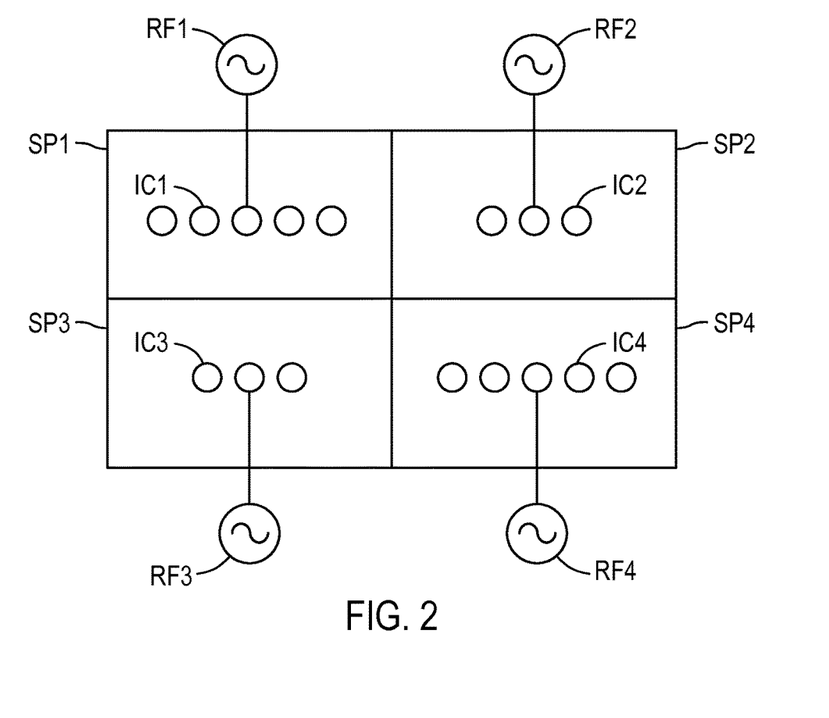
FIG. 2 illustrates an induction heating source array according to another embodiment of the disclosure.

Glass shapes with more than one radius of curvature can also be produced using the systems disclosed herein. For example, a magnetic field generator can comprise more than one induction coil in conjunction with a single susceptor plate. Alternatively, an array of magnetic field generators comprising one or more induction coils and/or power supplies can be employed in conjunction with an array of susceptor plates according to the disclosure. Such an array is illustrated in FIG. 2, which depicts four induction heating sources, each comprising an induction coil and a power supply, in conjunction with four susceptor plates (IC1, SP1, RF1) (IC2, SP2, RF2) (IC3, SP3, RF3) (IC4, SP4, RF4). Configurations such as that illustrated in FIG. 2, and variations thereof, can be implemented to achieve localized thermal distributions to produce complex target shapes. Various arrangements of induction coils and susceptor plates can be used to make asymmetrical shapes and/or to bend the glass structure in various different directions. While FIG. 2 depicts an array with adjacent induction coils, it is to be understood that other arrangements are possible, such as concentrically positioned coils.

Each induction coil can also be individually controlled in certain embodiments to achieve a desired temperature profile on the respective susceptor plate. Variable thermal distribution can thus be achieved on the glass structure to produce any number of glass shapes. According to one non-limiting embodiment, a central region of the glass structure may be heated to a first temperature via a first induction coil, an outer region of the glass structure may be heated to a second temperature via a second induction coil, and a peripheral region of the glass structure may be maintained at a third temperature, e.g., in the absence of an induction coil, these regions optionally being concentric with one another.

While FIG. 1 illustrates the induction heating source, e.g., magnetic field generator MF, and susceptor plate SP, as positioned above the glass structure G, this arrangement is not intended to be limiting, as the induction heating source and susceptor plate could be positioned beneath the glass structure G, or both above and below, and variations thereof. The relative orientation of the glass structure, induction heating source, and susceptor plate may thus vary as desired for a particular application.

Without wishing to be bound by theory, it is believed that the systems disclosed herein, e.g., the system illustrated in FIG. 1, may serve to create two or more regions on a glass structure surface having discrete temperatures with a significant differential between the temperatures of the two regions. In the case of a sag bending shaping process, such a temperature differential may be achieved, e.g., by locally heating the center of the glass structure without supplying heat to the edges of the glass structure. The systems disclosed herein may thus provide marked improvement in terms of achieving target shape as compared to prior art methods employing uniform heating profiles.

Figure 3:
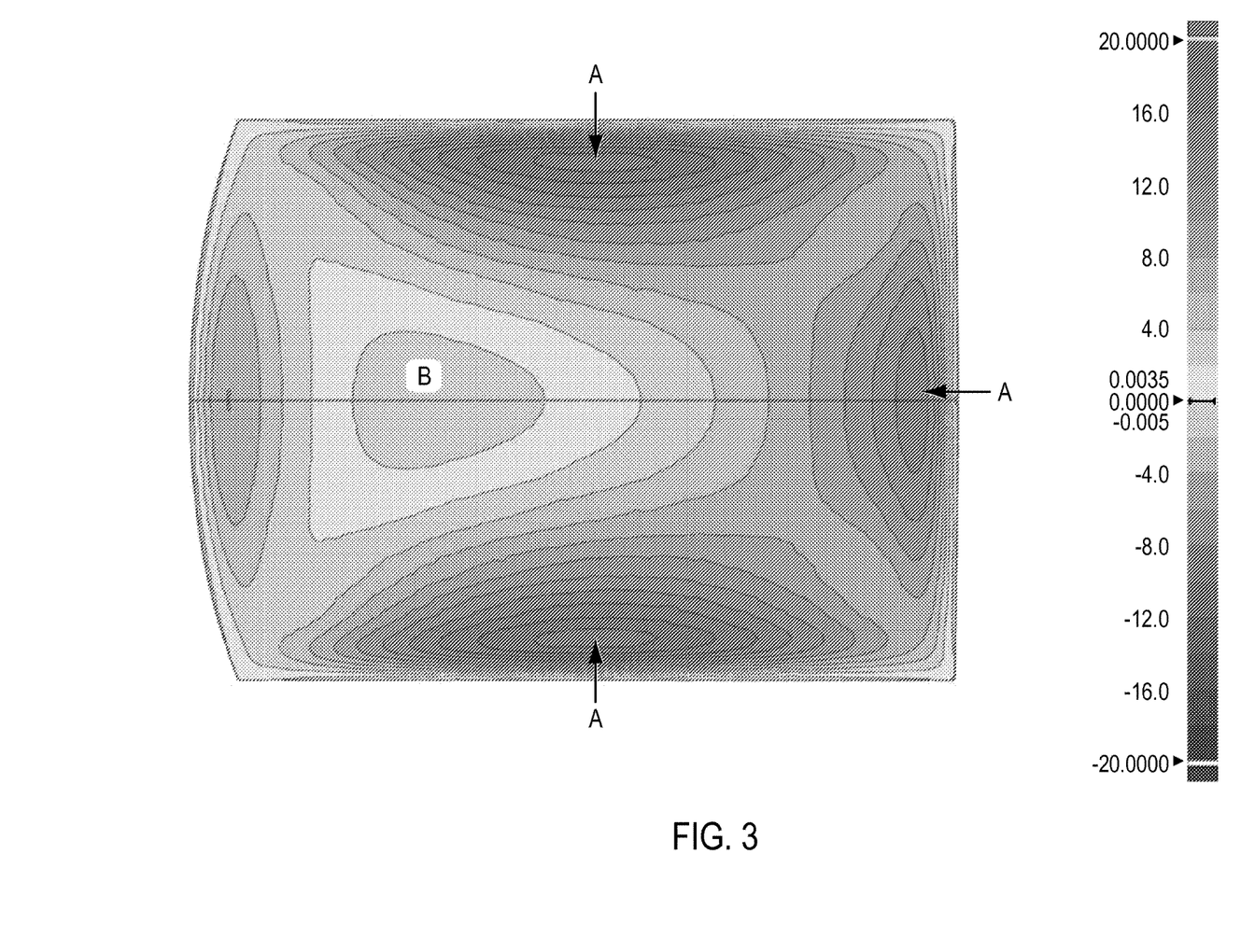
FIG. 3 is a deviation plot illustrating a part shape obtained using prior art uniform radiation heating methods.

Such prior art methods are illustrated in FIG. 3, which is a plot showing the shape deviation (mm) between the target part shape and the predicted part shape obtained by implementing a uniform heating profile for a 0.7 mm thick glass structure during a sag bending process. Regions denoted by "A" indicate over-sagging and the region denoted by "B" indicates under-sagging. The deviation plot illustrates that the glass region just inside the four edges of the structure has over-sagged by as much as about 20 mm, whereas the center of the structure has the approximate target shape. This "bathtub" phenomenon is particularly prevalent when shaping thin glass structures, e.g., glass structures having thicknesses less than about 3.0 mm, such as between about 0.3 mm and about 2.0 mm, or between about 0.5 mm and about 1.5 mm, including all ranges and subranges therebetween. Modeling results for thicker glass structures, such as those having conventional thicknesses of greater than about 3.0 mm, for example, about 3.2 mm or about 5.0 mm, show that the "bathtub" effect is not as severe.

Figure 4A:
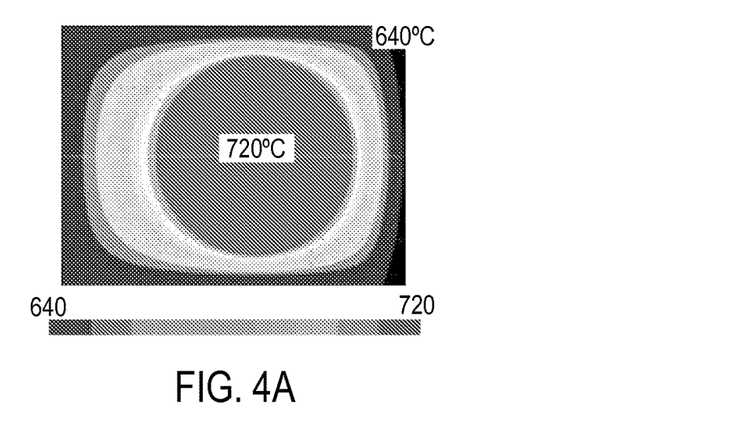
FIG. 4A is a thermal distribution illustrating a temperature differential between the edges and center of a glass structure shaped using differential heating methods.
Figure 4B:
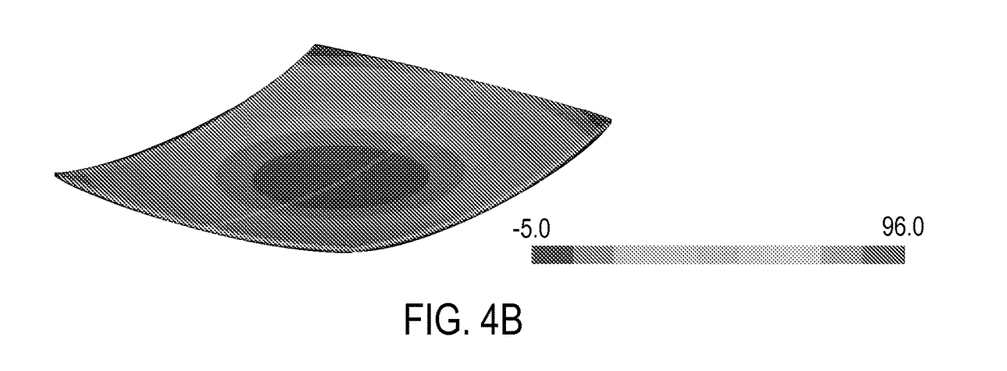
FIG. 4B is an illustration of a part shape obtained using the differential thermal distribution of FIG. 4A.
Figure 4C:
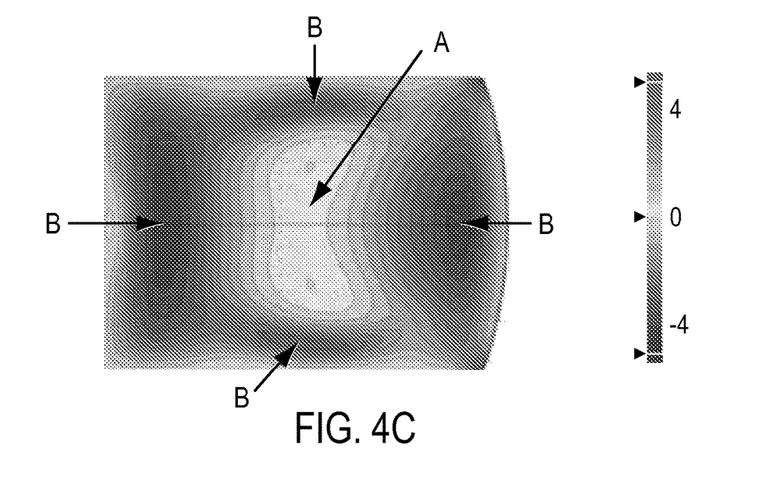
FIG. 4C is a deviation plot illustrating a part shape obtained using the differential thermal distribution of FIG. 4A.

Thus, especially for thinner glasses, it would be advantageous to provide shaping systems and methods implementing a differential heating profile across the glass structure. For instance, in the case of the target part shape of FIG. 3, it would be advantageous to employ a differential heating profile in which the peripheral region of the glass structure is heated at a lower temperature so as to maintain higher glass viscosity and limit viscous flow, while the center region of the glass structure is heated at a higher temperature to achieve the desired shape. Such a differential heating profile is illustrated in FIG. 4A, where an exemplary thermal distribution contemplates a central region of the glass structure at about 720° C. and the peripheral region of the glass structure at about 640° C. Thus, a temperature differential (ΔT) of approximately 80° C. exists in the illustration shown in FIG. 4A. FIG. 4B is an illustration of a part shape obtained by implementing the differential heating profile of FIG. 4A in a sag bending process, expressed as out of plane deformation (mm). FIG. 4C is a plot showing the shape deviation (mm) between the target part shape and the predicted part shape obtained by implementing the differential heating profile of FIG. 4A for a 0.7 mm thick glass structure during a sag bending process. In FIG. 4C the central region A is at the approximate target shape and the peripheral region B is slightly undersagged. Thus, as compared to FIG. 2, there is a marked reduction of over-sagging at the periphery.

A two-dimensional multi-physics model was set up in COMSOL to demonstrate various advantages of the instant disclosure. The model was used to calculate the magnetic field given an assumed coil current and frequency as well as an assumed susceptor material. The model was also used to calculate the eddy current heating generated in the susceptor and the glass heating due to radiation heat transfer between the susceptor and the glass structure. For purposes of modeling, the following assumptions were made: (1) a copper induction coil having a current amplitude of 2000 Å and a frequency of 50 kHz and (2) a susceptor plate comprising stainless steel.

Figure 5:
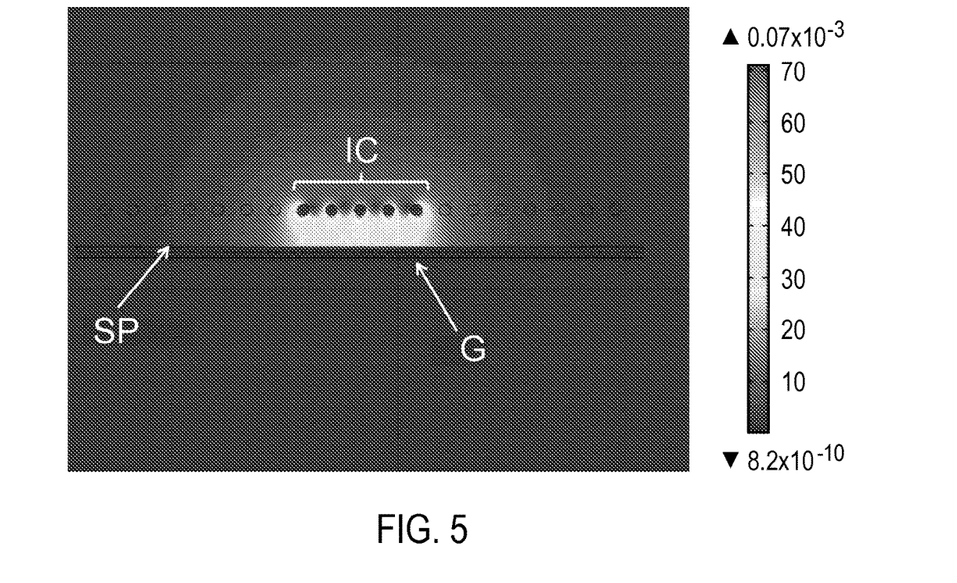
FIG. 5 is an illustration of magnetic flux density for a system implementing induction heating to create a differential thermal distribution according to one embodiment of the disclosure.
Figure 6:
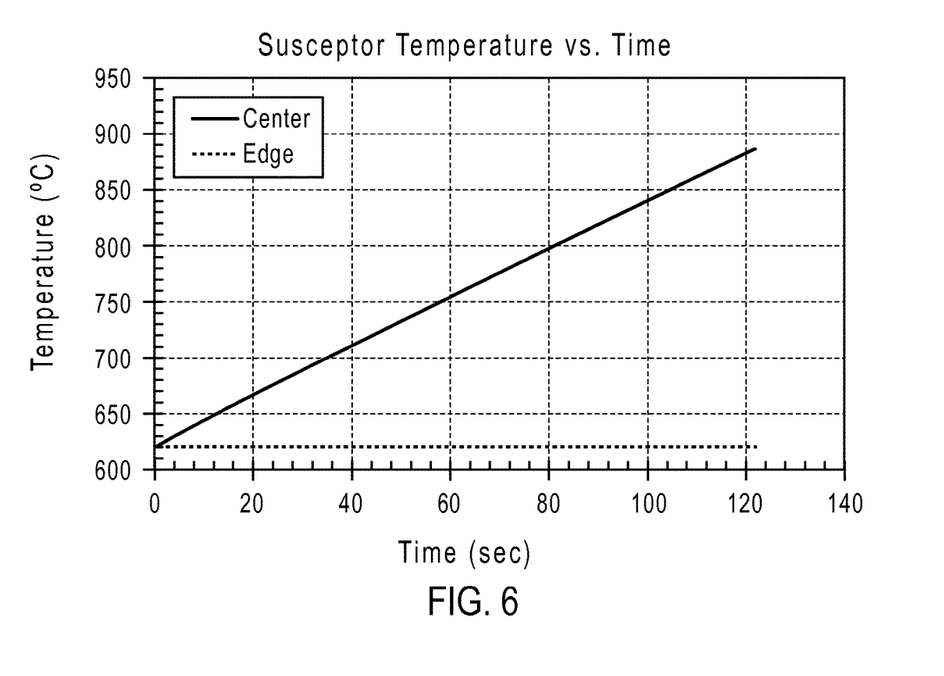
FIG. 6 is a plot illustrating susceptor plate temperature as a function of time according to various embodiments of the disclosure.
Figure 7:
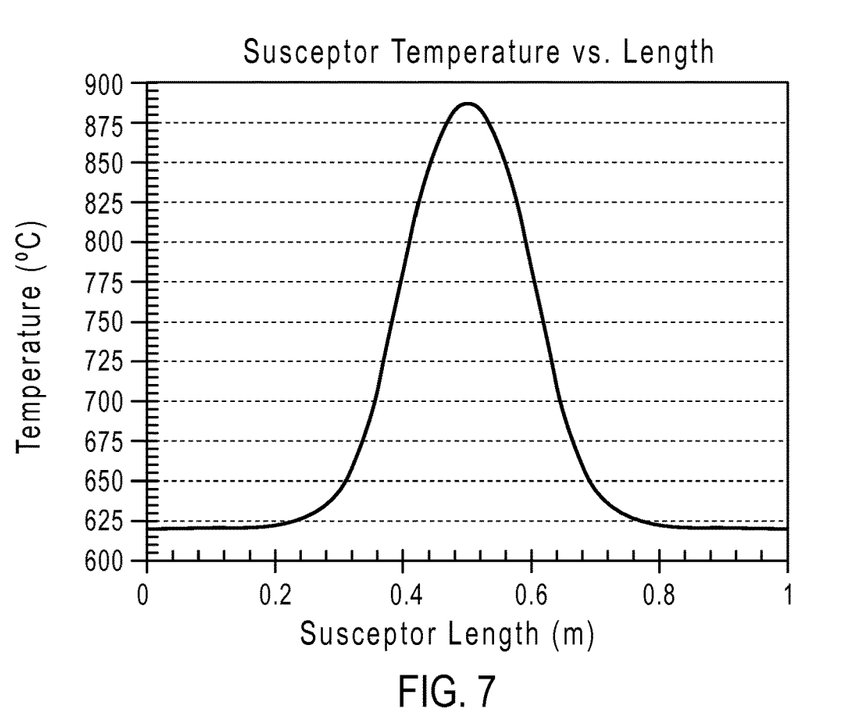
FIG. 7 is a plot illustrating susceptor plate temperature as a function of susceptor plate length according to various embodiments of the disclosure.

FIG. 5 illustrates the magnetic flux density contour in Teslas given an induction coil length of 20 cm. A significant magnetic flux density is noticeable only in the portion of the susceptor adjacent to the induction coil. The magnetic field can induce eddy currents in the susceptor plate, thereby resulting in inductive heating of the plate in areas where the magnetic flux is significant. For example, in the configuration shown in FIG. 5, the center of the susceptor plate will be heated whereas the edges of the susceptor will remain unheated. This is further demonstrated in FIG. 6, which plots the temperature of the edge and center portions of the susceptor plate as a function of time, where t=0 corresponds to the time that the glass structure enters the shaping system. FIG. 6 demonstrates that after about 120 seconds of operation, the center of the susceptor plate is heated to about 890° C., whereas the edge of the susceptor remains at a lower temperature of about 620° C. Moreover, FIG. 7 demonstrates that the size of the heated area of the susceptor plate is directly related to the size of the coil. For example, the temperature distribution in the susceptor at t=120 seconds with a coil length of 20 cm shows that a bell-shaped temperature distribution is obtained, wherein the heated center is approximately 20 cm in length and has a temperature of about 890° C., whereas the edges of the susceptor are approximately 620° C.

Figure 8:
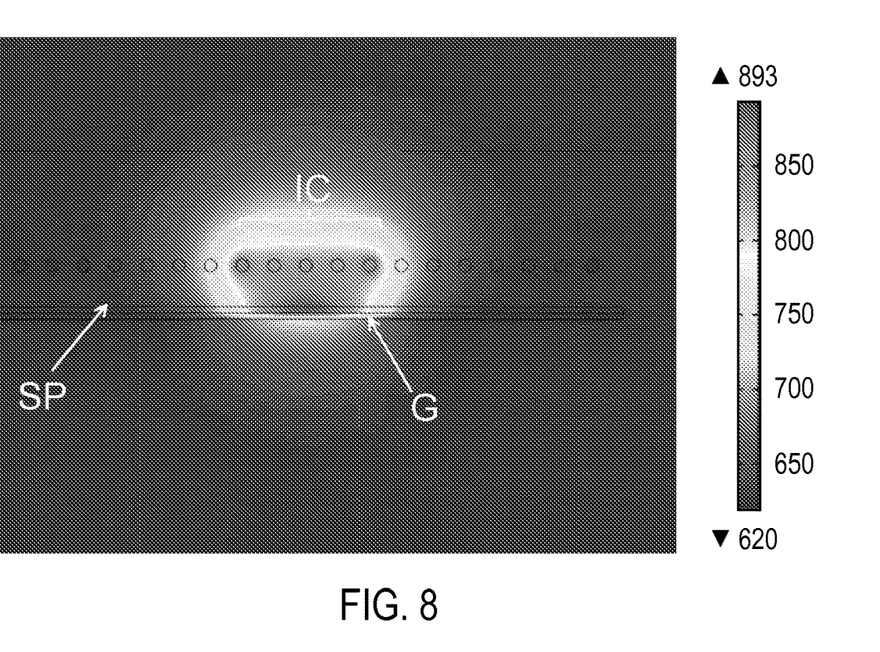
FIG. 8 is an illustration of temperature contours for a system implementing induction heating to create a differential thermal distribution according to one embodiment of the disclosure.
Figure 9:
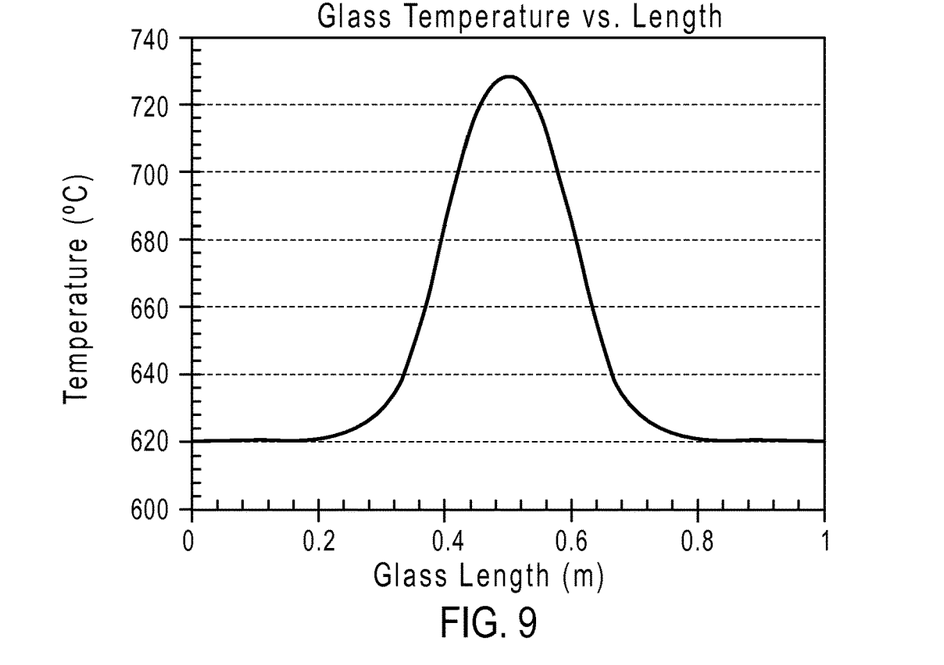
FIG. 9 is a plot illustrating glass temperature as a function of glass length according to various embodiments of the disclosure.
Figure 10:
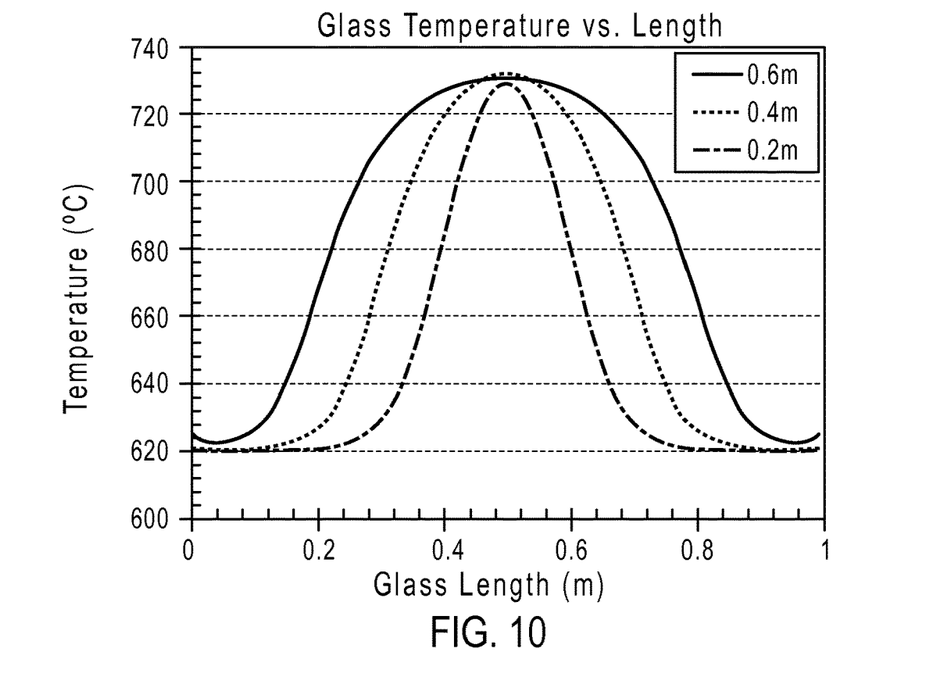
FIG. 10 is a plot illustrating glass temperature as a function of glass length for different induction coil lengths according to various embodiments of the disclosure.

The temperature contour plot illustrated in FIG. 8 was generated using the assumptions discussed above. Additional assumptions include: (1) uniform preheating of the glass structure to 620° C. prior to introduction into the shaping system and (2) a residence time t=120 seconds in the shaping system. As demonstrated in FIG. 8, only the portion of the glass proximate the susceptor plate adjacent the induction coil is heated to a temperature greater than the preheated temperature of 620° C. FIG. 9 further demonstrates a plot of glass temperature as a function of glass structure length, which shows that a bell-shaped glass temperature profile is achieved, with a central region at about 730° C. and an edge region at about 620° C. Moreover, as demonstrated in FIG. 10, which plots glass temperature as a function of glass length for three different lengths of induction coil, the size of the glass area to be heated can be regulated by adjusting the size, e.g., length, of the induction coil.

Methods

According to the methods disclosed herein, a glass structure may be positioned on a shaping mold and introduced into a furnace comprising an induction heating source. The glass structure may be introduced into a furnace or other heating device in any manner known in the art. According to various embodiments, the glass structure may be introduced using a conveyer, such as a roller or belt conveyor.

One or more portions of the glass structure may then be heated, e.g., to a forming or softening temperature, e.g., a point at which the structure can be effectively molded into a new shape. The glass structure can be heated indirectly by the induction heating source, e.g., by way of the susceptor plate. For instance, a magnetic field can be generated to induce heating in the susceptor plate and the glass structure can be heated by radiant heat transfer from the susceptor plate. According to various embodiments, one or more portions of the glass structure may be heated to a temperature ranging from about 400° C. to about 1000° C., such as from about 500° C. to about 900° C., from about 600° C. to about 800° C., or from about 650° C. to about 750° C., including all ranges and subranges therebetween.

In certain embodiments, the glass structure may be preheated to a predetermined temperature prior to being introduced into the bending furnace. For example, the methods disclosed herein may be implemented using a lehr comprising a number of stations arranged in a series. According to various embodiments, one or more preheating stations can be used to uniformly heat the glass structure to a predetermined temperature. Such preheating stations can use conventional, e.g., radiant, heat sources, such as infrared (IR) heaters. In certain embodiments, the glass structure can be preheated in one or more steps to a temperature ranging, for example, from about 300° C. to about 650° C., such as from about 400° C. to about 620° C., from about 450° C. to about 600° C., or from about 500° C. to about 550° C., including all ranges and subranges therebetween.

Upon introduction into the furnace or heating means, the glass structure can be heated as described above for a given residence time. The residence time may vary depending on the particular system and application. By way of non-limiting example, the residence time may range from about 1 to about 60 minutes or more, such as from about 5 to about 45 minutes, from about 6 to about 30 minutes, from about 12 to about 24 minutes, or from about 15 to about 20 minutes, including all ranges and subranges therebetween. After the given residence time, the glass structure may then exit the furnace or heating means and may undergo various additional processing steps known to those skilled in the art.

The methods and systems disclosed herein may be used to shape glass structures that are thinner than those shaped by current systems. For example, the methods and systems disclosed herein may be used to shape thin glass structures having a thickness ranging from about 0.1 mm to about 3 mm, such as from about 0.3 mm to about 2.5 mm, from about 0.5 mm to about 2 mm, from about 0.7 mm to about 1.5 mm, or from about 1 mm to about 1.2 mm, including all ranges and subranges therebetween. Alternatively, the systems disclosed herein may be used to shape thicker glass structures, for example, glass structures having a thickness greater than about 3 mm, such as greater than about 4 mm, or greater than about 5 mm. As noted above, exemplary glass structures include, but are not limited to, a single sheet of glass, multiple sheets of glass in a single stack, glass-glass laminate structures, and glass-polymer laminate structures.

The systems and methods disclosed herein may provide one or more advantages over prior art systems and methods employing standard uniform heating or differential heating profiles. In certain embodiments, the systems disclosed herein can be simpler than prior art differential heating systems by eliminating the need for multiple heating zones with multiple controllers. Moreover, the systems disclosed herein can eliminate the need for additional equipment such as heat shields and heat sinks. Improved control of glass temperature profiles can also be achieved by sizing the induction heating coil(s), instead of relying on heat shields to block radiant heat. Unlike heat shields, which can lose effectiveness as the get hotter during operation, the induction heating source can provide precise and reliable heating profiles that may not change over a period of operation. Further, the methods disclosed herein can eliminate the need for complex, variable preheating schemes, instead employing on one or more uniform preheating steps. Finally, current shaping systems such as furnaces can be retrofit to include one or more of the induction heating sources disclosed herein without excessive tooling, enhanced complexity, and/or increased cost. Of course, it is to be understood that the systems and methods disclosed herein may not have one or more of the above advantages, but are intended to fall within the scope of the appended claims.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "an induction coil" includes examples having two or more such coils unless the context clearly indicates otherwise. Likewise, a "plurality" is intended to denote "more than one." As such, a "plurality of induction coils" includes two or more such coils, such as three or more such coils, etc.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a system that comprises A+B+C include embodiments where a system consists of A+B+C and embodiments where a system consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A system for shaping a glass structure, comprising:
a magnetic field generator;
a susceptor plate comprising at least one major surface; and
a shaping mold configured to position the glass structure in the system such that at least one major surface of the glass structure is substantially parallel to the at least one major surface of the susceptor,
wherein the susceptor plate is positioned substantially between the magnetic field generator and the shaping mold.

2. The system of claim 1, wherein the magnetic field generator comprises at least one induction coil and at least one power supply connected to the at least one induction coil.

3. The system of claim 2, wherein the susceptor plate comprises a first major surface proximate the at least one induction coil and an opposing second major surface proximate the glass structure.

4. The system of claim 2, wherein the at least one power supply is a dielectric power supply producing an alternating current.

5. The system of claim 4, wherein the alternating current has a frequency ranging from about 1 kHz to about 400 kHz.

6. The system of claim 1, wherein the magnetic field generator induces heating in the susceptor plate.

7. The system of claim 1, wherein the glass structure is heated by radiant heat transfer from the susceptor plate.

8. The system of claim 1, further comprising a furnace, the furnace housing the shaping mold, magnetic field generator, and susceptor plate.

9. The system of claim 1, wherein the glass structure is selected from the group consisting of a single sheet of glass, multiple sheets of glass in a single stack, a glass-glass laminate structure, and a glass-polymer laminate structure.

10. The system of claim 1, comprising an array of magnetic field generators and susceptor plates.

11. A system for shaping a glass structure comprising:
a magnetic field generator comprising at least one induction coil and at least one power supply connected to the at least one induction coil; and
a susceptor plate having a first major surface proximate the at least one induction coil and an opposing second major surface proximate the glass structure,
wherein the second major surface of the susceptor plate is configured to be substantially parallel to at least one major surface of the glass structure.

12. The system of claim 11, wherein the at least one power supply is a dielectric power supply producing an alternating current.

13. The system of claim 11, wherein an alternating current flowing through the at least one induction coil induces heating in the susceptor plate.

14. The system of claim 11, wherein the glass structure is heated by radiant heat transfer from the susceptor plate.

* * * * *